United States Patent [19]

van der Loos et al.

[11] 4,200,593

[45] Apr. 29, 1980

[54] PROCESS FOR THE PREPARATION OF COPOLYMERS CONTAINING LOW MONOMER CONTENT

[75] Inventors: Jozef L. M. van der Loos, Sittard; Wilhelmus G. Duijzings, Born, both of Netherlands

[73] Assignee: Stamicarbon, B.V., Geleen, Netherlands

[21] Appl. No.: 925,626

[22] Filed: Jul. 17, 1978

[30] Foreign Application Priority Data

Jul. 19, 1977 [NL] Netherlands ......................... 7708002

[51] Int. Cl.$^2$ .................. C08F 212/06; C08F 212/10; C08L 9/00
[52] U.S. Cl. ..................................... 525/243; 526/86; 526/329.3; 526/342; 525/261; 525/263
[58] Field of Search ............. 260/880 R, 881; 526/86, 526/342

[56] References Cited

U.S. PATENT DOCUMENTS

| | | | |
|---|---|---|---|
| 2,665,271 | 1/1954 | Beller | 526/264 |
| 3,010,936 | 11/1961 | Irvin | 526/86 |
| 3,053,800 | 9/1962 | Grabowski et al. | 260/891 |

Primary Examiner—Harry Wong, Jr.
Attorney, Agent, or Firm—Cushman, Darby & Cushman

[57] ABSTRACT

An improved process for the preparation of copolymers by the polymerization of from about 25 to 85 parts by weight of a styrene and/or α-methylstyrene monomer together with about 15-75 parts by weight of acrylonitrile and/or methacrylonitrile monomer in an aqueous dispersion in the presence of a compound yielding free radicals is disclosed whereby the quantity of monomer remaining in the copolymer after polymerization is substantially reduced. A compound yielding water-soluble free radicals is added to the aqueous reaction medium, containing copolymer as well as non-converted monomer, in a quantity of between about 0.05 and 2.5 parts per 100 parts by weight of monomer and copolymer present in the reaction medium, at a point of time at which (a) the rate of conversion of monomer to copolymer is less than 15% per hour, (b) the degree of conversion of monomer to copolymer is greater than 75%, and (c) at least 0.1 weight percent of non-converted acrylonitrile and/or methacrylonitrile relative to the total weight of the reaction medium, remains in the reaction medium, and whereafter no additional monomer is added.

15 Claims, No Drawings

PROCESS FOR THE PREPARATION OF COPOLYMERS CONTAINING LOW MONOMER CONTENT

BACKGROUND OF THE INVENTION

The invention relates to an improved process for the preparation of copolymers by polymerization of a mixture of monomers containing about 85 to 25 parts by weight of styrene and/or α-methylstyrene, about 15 to 75 parts by weight of acrylonitrile and/or methacrylonitrile, and possibly minor quantities of one or more other monomers, which polymerization is carried out in an aqueous dispersion in the presence of one or more compounds yielding free radicals.

This process is well known and has been applied in large scale proportion. However, it yields copolymer products frequently containing considerable quantities of non-converted monomers, up to a few percent depending on the polymerization conditions. The monomer residues are highly undesirable inasmuch as they have an adverse affect on the properties such as gloss and heat resistance, of the end product copolymer. Furthermore, these non-converted monomers may be released from the copolymer product during its subsequent processing or in its end use application, which is highly undesirable in view of their toxicity and the undesirable environmental impact.

Because of these shortcomings of this known process, intensive research has been carried out over a number of years to find methods by which the monomer content of such polymers could be reduced. This research has resulted in a number of proposed solutions, but none are entirely satisfactorily.

For instance, it has been proposed to treat the polymer dispersion with steam for the purpose of stripping part of the non-converted monomers from the polymer. This treatment may be effective, particularly with a protracted treatment, but it is expensive with regard to both investment cost and energy consumption.

Another proposal has been to carry out the removal of monomers in a so-called degasifying extruder. The polymer is melted in an extruder with the simultaneous build-up of high pressure. The product is then introduced into a zone where the pressure is greatly reduced with the result that the volatile monomer components are vaporized and exhausted. However this process requires a very high initial investment and the capacity of such a degasifying extruder is necessarily low if a high removal efficiency is to be achieved.

U.S. Pat. No. 3,991,136 proposes another solution wherein, after the polymerization has proceeded to a degree of conversion of about 90%, a new monomer is added which is very reactive with the non-converted monomer in the final polymer. However, this new monomer should be added in a quantity of five to ten percent by weight with the result that it may substantially influence or affect the ultimate properties of the polymer produced. Furthermore, the addition of such a new monomer would involve relatively high costs resulting from the additional investments and operations it requires.

It is an object of the present invention to provide an improved process yielding polymers of a very low monomer content without the necessity of adding additional monomers.

It is a further object of this invention to provide a solution to the problem of removing non-converted monomer from polymers without adversely influencing or affecting the properties of the final polymer product.

It is yet another object of this invention to reduce the environmental impact and possible risks which might result from monomer emission during production, processing and/or use of a polymer having a relatively high monomer content.

And it is also an object of the invention to increase the degree of conversion of monomer to polymer, thereby increasing the efficiency of polymerization of such monomers by increasing the capacity of the polymerization reactors and utilizing monomers in a more efficient way.

SUMMARY OF THE INVENTION

It has now been found that these objectives can be obtained by adding to the monomer-polymer containing reaction mixture near the end of the polymerization and at a carefully chosen point of time, a specified amount of one or more compounds yielding water-soluble free radicals.

This improved process is particularly applicable to the preparation of copolymers produced by the polymerization of styrene and/or α-methylstyrene with acrylonitrile and/or methylacrylonitrile, in an aqueous dispersion in the presence of an initiator, that is, compounds yielding free radicals. Specifically, it has been found that the monomer content of the copolymer thus produced can be substantially reduced by additionally adding a compound, yielding water-soluble free radicals, to the monomer-polymer containing reaction mixture near the end of the polymerization reaction, in a quantity of 0.05 to 2.5 parts per 100 parts of monomer and polymer present in the reaction medium. The time of addition is very important and must be at a point of time at which (a) the rate of conversion of monomer to copolymer is less than 15% per hour, (b) the degree of conversion of monomer to copolymer is greater than 75%, and (c) at least 0.1% of non-converted acrylonitrile and/or methacrylonitrile by weight relative to the total weight of the reaction medium remains in the reaction medium. Furthermore such compound must be added only after the addition of monomer to the reaction medium has been terminated.

It has thus surprisingly been found that a simple procedure as described above, provided it is carried out at the appropriate point of time and with the proper compounds, is capable of substantially reducing monomer content of the end product, while at the same time significantly increasing the capacity of the polymerization reactor and permitting the monomer feed stocks to be utilized in a more efficient manner. Furthermore, it has been found this improved process does not adversely affect the properties of the final polymer product. To the contrary, it has been found that the polymer products resulting from this improved polymerization process have superior flow and heat distortion temperature characteristics. Moreover, in certain applications it has been found that the copolymer of the improved process results in a substantial reduction of drying-time.

An additional advantage of obtaining a polymer having such a low monomer content is that the necessity for, or capacity of, subsequent processing steps, such as intensive and long drying and/or the application of degasifying extruders, is substantially reduced.

It would be expected that the introduction of an additional amount of free-radical yielding compound to the monomer-polymer containing reaction medium near the end of the polymerization process would result in a copolymer whose composition would deviate from the copolymer already produced, resulting in a non-homogeneous product. Specifically, it would be expected that at the end of the polymerization, when the polymer to monomer ratio is very high, transfer reactions with the polymer would occur resulting in linkage reactions which might affect the processability of the resulting polymer. (See Emulsion Polymerization Theory & Practice, D. C. Blackley, 1975 at pages 71 and 72). However, it appears that these disadvantages do not occur if one proceeds according to the invention.

DETAILED DESCRIPTION OF THE INVENTION

The polymerization process of the present invention is carried out in an aqueous dispersion of the monomers involved. The term aqueous dispersion as used herein should be understood to include both emulsions and suspensions. However the use of emulsion polymerization is preferred inasmuch as the best results are thereby obtained.

The invention is particularly applicable to the copolymerization of monomers of styrene and/or α-methylstyrene in a proportion of about 85-25 parts by weight to 15-75 parts by weight of acrylonitrile and/or methacrylonitrile. However other monomers may also be included in the polymerization in minor quantities, that is up to a total of approximately 15 parts by weight. These other monomers include inorganic vinyl compounds and/or alkyl compounds, flame retarders to be built into the copolymer, or multi-functional compounds such as di-vinyl benzene or an alkyl ester of acrylic or methacrylic acid.

The invention is particularly applicable in the production of copolymers by the polymerization of monomers in a proportion of more than 50% by weight of styrene, in particular α-methylstyrene. α-Methylstyrene monomer is very difficult to remove from the resulting polymers, and serious problems can occur from the presence of this monomer in the finished product. The improved process of the invention appears to yield particularly excellent results with respect to such polymers.

In carrying out this polymerization in an aqueous dispersion, the usual auxiliary materials necessary for that purpose should be applied. These include particularly initiators, such as peroxides, but also includes emulsifiers, lye, suspension agents, salts, soaps, and molecular weight regulators. With respect to initiators for use with emulsion polymerization, preference is given to alkali or ammonium persalts such as potassium persulphate, ammonium persulphate and sodium persulphate, and/or redox systems. Examples of applicable redox systems include persalts such as perchlorates or persulphates such as tert. butyl hydroperoxide, cumene hydroperoxide, diisopropyl benzene hydroperoxide and methyl cyclohexyl hydroperoxide, combined with reduction agents based on acids containing sulphur in a low valency state, such as sodium formaldehyde sulphoxylate, bisulphite, pyrosulphite, or organic bases like triethanolamine or metal salts such as ferrous sulphate, and further, dextrose, sodium pyrophosphate and mercaptans or combinations thereof. These initiators or initiator systems may be supplied to the dispersion all at once, step-wise, or even gradually during the course of the polymerization reaction.

The emulsion polymerization of the present invention can also be carried out with good results in the presence of a previously prepared rubber latex, for instance a polybutadiene latex. In addition to the formation of the free polymer, a graft polymer may also form which has an influence on the impact strength of the final product. Such a previously prepared rubber latex may advantageously be present during the polymerization in an amount of up to about 50 percent by weight relative to the total amount of monomer being polymerized.

Generally, the polymerization of monomers in emulsion form starts very slowly whereafter the rate of conversion slowly increases to reach a maximum of a few hundred percent per hour. At this high conversion rate, considerable heat is produced within a relatively short period of time which results in an increase in temperature of the reaction medium inasmuch as it is not possible to adequately remove this rapidly developing heat. Subsequently, however, the rate of conversion slowly decreases whereupon, in the prior art processes, the polymerization is discontinued at a point of time at which the rate of polymerization has become too small to be efficiently or advantageously continued, even though a significant quantity of monomer is still present.

According to the improved process of the present invention, however, it has been found that the polymerization reaction can be advantageously continued beyond the point at which it was previously terminated under the prior art, thereby more efficiently utilizing the monomer feed stock and decreasing the monomer content of the end product. This is accomplished by adding a specified amount of an additional initiator compound, yielding water-soluble free radicals, to the polymer-monomer containing reaction medium at a certain defined time near the end of the polymerization reaction.

Such additional initiator compounds yielding water-soluble free radicals, suitable for use in the invention, are often themselves water-soluble. Examples of such compounds are potassium persulphate and ammonium persulphate. But also compounds which are not themselves completely water-soluble, but yield water-soluble free radicals, can be applied with very good results. Examples of the latter type of compounds are tert. butyl per compounds, such as di-tert. butyl peroxide, di-tert. butylperoxydicarbonate, tert. butyl peracetate, tert. butyl perpivalate, tert. butyl perbenzoate, and tert. butyl hydroperoxide. These compounds are particularly preferable inasmuch as very stable latices are thereby obtained, which is an important feature during transportation and storage of the latices.

Additionally, compounds which are not completely water-soluble and which form part of a redox system which yields water-soluble free radicals can also be applied. Examples of this type of compound are cumene hydroperoxide, diisopropyl benzene hydroperoxide, triisopropyl benzene hydroperoxide, tert. butyl isopropyl benzene hydroperoxide and dodecyl isopropyl benzene hydroperoxide.

The amount of additional initiator compound, yielding water-soluble free radicals, should generally be within a range of about 0.05 to 2.5 parts by weight per 100 parts of monomer and polymer present in the reaction medium. It is also preferable that the amount of such additionally added initiator compound be approximately 25 to 500 percent, and more preferably 50 to 300 percent, of the quantity of initiator utilized for the primarily polymerization reaction. Although it is not necessary, it may be advantageous if the additionally supplied initiator is the same compound, or compounds, which are used at the beginning of the polymerization.

A very important factor in the success of the improved process of the invention is the time at which the additional initiator compound is added to the reaction medium. It has been found that the affect of the present invention cannot be achieved through merely an increase in the quantity of initiator added at the beginning of, or even during the course of, the polymerization reaction. Furthermore, the supply of additional initiator compound to the reaction medium at about the time the temperature peak occurs during the course of the polymerization also does not yield a favorable result. To the contrary, the introduction of free radicals at such time has a negative influence on a number of the properties of the final polymer product, such as the notch impact strength at low temperatures and stiffness.

Thus, according to the invention, it has been found that the most advantageous results are achieved if the additional initiator compound is added after all monomer additions have been terminated and at a point of time at which the rate of conversion of monomer to copolymer is less than 15% per hour and the degree of conversion is greater than 75%. The term degree of conversion as used herein means the quantity of monomers converted into polymers relative to the total quantity of monomers initially present in the dispersion or subsequently added to the reaction medium during the course of the polymerization, expressed as a percentage. Although the additional initiator compound may advantageously be added after the degree of conversion reaches 75%, preferably it will be added after the degree of conversion reaches 80%, and more preferably 90%.

The term rate of conversion as used herein means the rate at which monomer is converted into polymer, here expressed as a percentage of conversion taking place within an hour. Although the additional initiator compound may be added when the rate of conversion has dropped to 15%, better results are obtained is such addition is made after the rate of conversion has become lower, preferably less than 8% per hour and more preferably lower than 4% per hour.

It is also important, to achieve the beneficial results of this invention; that the introduction of the additional initiator compound to the reaction medium not be effected too late either. Specifically, the quantity of non-converted acrylonitrile and/or methacrylonitrile in the reaction medium should not be less than 0.1 weight percent relative to the total weight of the reaction medium. Preferably, this weight percent should be higher than 0.2% and more preferably higher than 0.5%. At lower values, very little reduction of the proportion of residual monomers occurs, especially with regard to the proportion of styrene and/or α-methylstyrene monomers. This latter observation has been very surprising inasmuch as styrene in particular is known to polymerize very easily.

For determining the proper time of addition in accordance with the invention, the weight percentage of non-converted acrylonitrile and/or methacrylonitrile is calculated with reference to the total weight of the reaction medium, including the water together with all substances dissolved and/or dispersed therein.

At the time the additional amount of initiator compound yielding water-soluble free radicals is introduced into the reaction medium, the temperature of the reaction medium should be sufficiently high. Preferably, this temperature should be above 30° C., and most preferably above 45° C. On the other hand, the temperature should not be too high. Suitable maximum reaction medium temperatures at the time of such addition lie below 120° C. and preferably below 100° C.

The half-life period of the additional initiator compound yielding water-soluble free radicals should not be too high, preferably being less than 5 hours, and more preferably less than 2 hours, at the temperatures involved. It is advantageous to utilize such compounds having short half-life periods, which can be accomplished by balancing the choice of temperature against the choice of the compound. A half-life period smaller than 1 hour at the chosen temperature is most preferable.

EXAMPLE 1

52 g of acrylonitrile, 20 g of styrene and 98 g of α-methylstyrene were added, with the exclusion of air, to 420 g of oxygen-free, deionized water, in which was dissolved 0.28 g of KOH and 4.0 g of rosin soap, and an emulsion was formed. After this mixture had been brought at 50° C. by means of an oil bath having a temperature of 75° C., a redox initiator system was added consisting of 0.84 g of cumene hydroperoxide, 0.02 g of ferrous sulphate dissolved in 10 g of water, and a mixture of 1.0 g of sodium pyrophosphate and 1.2 g of dextrose dissolved in 30 g of water.

As a result of the heat of polymerization, the temperature of the polymerization reaction medium rose to 86.5° C. in 31 minutes and thereafter gradually dropped to 75° C. To determine the content of non-converted monomer, a sample of 1 ml was taken from the reaction medium after 90 minutes, counting from the point of time the initiator system was added. From this sample, after dilution with dimethyl formamide, the quantity of non-converted monomer was determined by gas-chromatography, and the degree of monomer conversion was calculated. This amounted to 94.9% at this point of time. The conversion or polymerization rate can be determined by taking 2 samples in succession within a known, short time interval. This rate amounted to 1.2% per hour at this point of time. Immediately after the sampling, 0.34 ml of a 75% solution of tert. butyl perpivalate in mineral oil was added to the reaction mixture in accordance with the process of the invention. The half-life period of this peroxide is 0.8 hr at the reaction medium temperature of 75° C.

The residual monomer content in the reaction medium was subsequently determined after 120 and 150 minutes from the beginning of the polymerization, in the same manner as described above. From the monomer concentrations taken after 90 and 150 minutes, the rate of monomer conversion (mon. conv. $v$) during the last hour of the polymerization can be calculated as follows:

$$\text{mon. conv.} v = \frac{C\ 90\ \text{min.} - C\ 150\ \text{min.}}{C\ 90\ \text{min.}} \times 100\%$$

The results of this calculation are reported on Table 1 under Example 1.

COMPARATIVE EXAMPLE 1a

The polymerization was carried out in a manner completely identical to that described in Example 1, except that the addition of the tert. butyl perpivalate was omitted in this experiment. The results of this experiment are reported on Table 1A under Example 1a. Comparing the residual monomer contents of this comparative example with those of Example 1 clearly shows that the residual acrylonitrile, styrene and α-methylstyrene monomer concentrations are decreased a considerably greater amount in the process according to the invention (Example 1) than in this comparative Example 1a.

EXAMPLE 2

Example 1 was repeated except that 60 g of a polybutadiene rubber latex containing 50% by weight solids was added to increase the impact strength. The total quantity of water was adjusted so as to be the same as in Example 1. The results of this experiment are found in Table 1 under Example 2.

COMPARATIVE EXAMPLE 2a

Example 2 was repeated, but without addition of tert. butyl perpivalate, in order to demonstrate the effect of adding a compound yielding water-soluble free radicals in accordance with the invention, where the polymerization is carried out also in the presence of rubber latex. This experiment was carried out in duplicate and the results of both runs are reported on Table 1A under Example 2a.

Table 1

| | Examples according to the invention | |
|---|---|---|
| | 1 | 2 |
| At point of time extra agent yielding free radicals is added: | | |
| - monomer conversion % | 94.9 | 94.9 |

Table 1-continued

| - polymerization rate %/hr | 1.2 | | 1.5 | |
|---|---|---|---|---|
| time (min.) | monomer* | w.-% free mon. | mon. conv. U %/hr | w.-% free mon. | mon. conv. U %/hr |
| 90 | ACN | 0.96 | | 0.78 | |
| | S | 0.10 | | 0.16 | |
| | amS | 0.31 | | 0.71 | |
| 120 | ACN | 0.72 | | 0.53 | |
| | S | 0.04 | | 0.07 | |
| | amS | 0.09 | | 0.30 | |
| 150 | ACN | 0.65 | 32 | 0.49 | 37 |
| | S | 0.03 | 70 | 0.07 | 56 |
| | amS | 0.07 | 77 | 0.27 | 62 |
| HDT (annealed)** °C. | | | | 114 | |

*
ACN = acrylonitrile
S = styrene
amS = α-methylstyrene
HDT**(annealed) = Heat Distortion temperature measured according to ASTM D 648 at a bending stress of 18.5 kg/cm² after conditioning at 105° C. for 2 hours and cooling in the air

Table 1A

| | Comparative examples | | |
|---|---|---|---|
| | 1a | 2a | 2b |
| At point of time extra agent yielding free radicals is added: | | | |
| - monomer conversion % | 93.6 | 93.3 | 72 |
| - polymerization rate %/hr | | | 83 |

| time (min.) | monomer* | w.-% free mon. | mon. conv. U %/hr | w.-% free mon. | mon. conv. U %/hr | w.-% free mon. | mon. conv. U %/hr |
|---|---|---|---|---|---|---|---|
| 90 | ACN | 0.93 | | 0.85 (0.71) | | 0.81 | |
| | S | 0.10 | | 0.16 (0.14) | | 0.12 | |
| | amS | 0.34 | | 0.70 (0.61) | | 0.47 | |
| 120 | ACN | 0.86 | | 0.76 (0.66) | | 0.76 | |
| | S | 0.09 | | 0.12 (0.12) | | 0.11 | |
| | amS | 0.26 | | 0.55 (0.52) | | 0.42 | |
| 150 | ACN | 0.80 | 14 | 0.72 (0.61) | 15 (14) | 0.69 | 15 |
| | S | 0.08 | 20 | 0.12 (0.11) | 25 (21) | 0.10 | 17 |
| | amS | 0.21 | 38 | 0.50 (0.45) | 29 (26) | 0.35 | 26 |
| HDT (annealed)** °C. | | | | 106 | | 108 | |

*
ACN = acrylonitrile
S = styrene
amS = α-methylstyrene
HDT**(annealed) = Heat Distortion temperature measured according to ASTM D 648 at a bending stress of 18.5 kg/cm² after conditioning at 105° C. for 2 hours and cooling in the air

COMPARATIVE EXAMPLE 2b

The experiment of Example 2 was again repeated, except that the tert. butyl perpivalate was added at the peak temperature, at which point of time the degree of conversion amounted to only 72% (according to gas-chromatographic analysis). The purpose of this experiment was to demonstrate that the addition of the compound yielding water-soluble free radicals must take place after the degree of conversion is greater than 75%, in order to realize the beneficial results of the invention. The conversion rate of monomer to polymer amounted to 83% per hr at the moment of the addition. The results of this experiment are reported on Table 1A and show that in the introduction of additional initiator at the time of peak temperature gives no extra decrease in the free monomer content of the polymer as compared to where no tert. butyl perpivalate was added, as in Example 2a.

EXAMPLE 3

In this Example the polymerization of acrylonitrile, styrene and α-methylstyrene was carried out in 2 steps in which, according to the invention, extra potassium persulphate was added at the end of the second step. In the first step, the following ingredients were successively added to a polymerization vessel while stirring: 230 g of water, 60 g of a 50% polybutadiene latex, 2 g of rosin soap, 0.14 g of KOH, 10 g of styrene, 26 g of acrylonitrile, 49 g of α-methylstyrene, and 0.2 g of tert. dodecyl mercaptan whereby an emulsion was formed. After this reaction mixture had been heated to 40° C. with the aid of a 65° C. bath the initiator system was added, which consisted of 0.84 g of cumene hydroperoxide, a mixture of 1.2 g of dextrose and 1.0 g of sodium pyrophosphate dissolved together in 30 g of water, and 0.02 g of ferrous sulphate dissolved in 10 g of water. After 2 hours following addition of the initiator system, about 95% of the monomers had been converted into polymers.

Subsequently, for the second step of the polymerization, the following was added to the polymer latex formed in step 1: 150 g of water, 2 g of rosin soap, 0.14 g of KOH, 10 g of styrene, 26 g of acrylonitrile, 49 g of α-methylstyrene, and 0.6 g of tert. dodecyl mercaptan. After this mixture had again reached a temperature of 50° C., 0.4 g of potassium persulphate dissolved in 10 g of water was added to it as initiator. Ninety minutes after this second step of the polymerization had been started, the conversion, determined by gas-chromatography, amounted to 90.5%. At this point of time, in accordance with the invention, 0.4 g of potassium persulphate dissolved in 10 g of water was added and the decrease of the non-converted monomer was continued. The results of this experiment are reported on Table 2.

COMPARATIVE EXAMPLE 3a

Example 3 was repeated, except without the addition of the extra potassium persulphate supply at the end of the second step. Comparison of the results of Examples 3 and 3a are reported on Table 2 and shows that when the process is carried out according to the invention, a substantially improved monomer removal has taken place.

EXAMPLES 4 to 10 Inclusive

In this series of Examples, Example 1 was repeated, except with a different initiator or free-radical yielding compound being added in each Example after 90 minutes. In Examples 4 and 5, which are according to the invention, considerably more monomer was converted into polymer during the last hour of the polymerization than in Examples 6 to 10 inclusive, wherein the free radical-yielding compound added after 90 minutes generates water-insoluble radicals. The results of these Examples are tabulated on Tables 3 and 3A. On Tables 3 and 3A the following abbreviations are used:

KPS = potassium persulphate
CHP = cumene hydroperoxide
Perk. Y 16 = bis (4-tert.butyl cyclohexyl) peroxydicarbonate
IPP = diisopropyl peroxydicarbonate
SP = stearyl percarbonate
DLPO = dilauroyl peroxide
AVN = azobisdimethyl valeronitrile

Table 2

| experiment | | 3 | | 3a | |
|---|---|---|---|---|---|
| total monomer conv. after 90 min. in 2nd step in % | | 90.5 | | 90.4 | |
| time (min) | monomer | w. - % | monomer Conv. $\upsilon$ %/hr | w. - % | monomer conv. $\upsilon$ %/hr |
| 90 | ACN | 0.94 | | 0.94 | |
| | S | 0.22 | | 0.19 | |
| | αmS | 0.69 | | 0.91 | |
| 120 | ACN | 0.64 | | 0.80 | |
| | S | 0.13 | | 0.16 | |
| | αmS | 0.69 | | 0.91 | |
| 150 | ACN | 0.53 | 44 | 0.75 | 20 |
| | S | 0.10 | 55 | 0.15 | 21 |
| | αmS | 0.53 | 58 | 0.82 | 29 |
| HDT annealed °C. | | 111 | | 108 | |

Table 3

| | | Examples | | | | Comparative examples | | | |
|---|---|---|---|---|---|---|---|---|---|
| | | 4 | | 5 | | 6 | | 7 | |
| initiator applied | | 0.4 g KPS | | 1 ml CHP + red. system acc. to ex. 1 | | 0.6 g Perk Y16 | | 1 ml IPP | |
| half-life period initiator in hr | | c. 0.5 | | <1 | | 0.1 | | 0.1 | |
| time | monom. | w.- % | mon. conv.$\upsilon$ %/hr | w.- % | mon. conv.$\upsilon$ %/hr | w.- % | mon. conv.$\upsilon$ %/hr | w.- % | mon. conv.$\upsilon$ %/hr |
| 90 | ACN | 0.78 | | 0.90 | | 0.80 | | 0.85 | |
| | S | 0.17 | | 0.15 | | 0.15 | 1 | 0.16 | |
| | αmS | 0.69 | | 0.58 | | 0.68 | | 0.70 | |
| 120 | ACN | 0.56 | | 0.55 | | 0.71 | | 0.76 | |
| | S | 0.08 | | 0.07 | | 0.12 | | 0.12 | |
| | αmS | 0.34 | | 0.16 | | 0.55 | | 0.55 | |
| 150 | ACN | 0.50 | 36 | 0.45 | 50 | 0.66 | 18 | 0.72 | 15 |
| | S | 0.07 | 59 | 0.03 | 80 | 0.11 | 27 | 0.12 | 25 |
| | αmS | 0.25 | 64 | 0.12 | 79 | 0.46 | 32 | 0.50 | 29 |

Table 3-continued

|  | Examples | | Comparative examples | |
|---|---|---|---|---|
|  | 4 | 5 | 6 | 7 |
| HDT annealed °C. | 112 | 112 | 110 | 106 |

Table 3A

| | | Comparative Examples | | | | | |
|---|---|---|---|---|---|---|---|
| | | 8 | | 9 | | 10 | |
| initiator applied | | 1.24 g SP | | 0.6 g DLPO | | 0.37 AVN | |
| half-life period initiator in hr | | 0.35 | | 1.7 | | 0.8 | |
| time | monom. | w.-% | mon. conv.$_U$ %/hr | w.-% | mon. conv.$_U$ %/hr | w.-% | mon. conv.$_U$ %/hr |
| 90 | ACN | 0.81 | | 0.80 | | 0.74 | |
| | S | 0.15 | | 0.15 | | 0.15 | |
| | amS | 0.68 | | 0.63 | | 0.68 | |
| 120 | ACN | 0.72 | | 0.72 | | 0.68 | |
| | S | 0.12 | | 0.12 | | 0.11 | |
| | amS | 0.54 | | 0.52 | | 0.50 | |
| 150 | ACN | 0.70 | 14 | 0.68 | 18 | 0.61 | 18 |
| | S | 0.11 | 27 | 0.11 | 27 | 0.10 | 33 |
| | amS | 0.47 | 31 | 0.46 | 27 | 0.41 | 40 |
| HDT annealed °C. | | 110 | | 105 | | 110 | |

EXAMPLES 11 and 12

Examples 11 and 12 followed the same procedures of Example 1 except that the polymerization process was applied to a mixture containing acrylonitrile and α-methylstyrene (but no styrene) in the proportions stated on Table 4, and instead of the redox initiator system, potassium persulphate was used. After a polymerization time of 120 minutes, 0.8 g of potassium persulphate dissolved in 10 g water was added. The composition of the monomer mixture was such that the concentration of the water-soluble component (acrylonitrile) under these polymerization conditions varied strongly at the time of adding the extra quantity of potassium persulphate.

From the calculated monomer conversion during the last hour (mon. conv. U) it clearly appears that α-methylstyrene removal decreases strongly as the ACN monomer concentration in the reaction medium declines. The results of this experiment are reported on Table 4.

EXAMPLE 13

This comparative Example was carried out in a manner analogous to Examples 11 and 12, except that the monomer mixture was such that the acrylonitrile monomer concentration in the reaction medium at the time of addition of the extra quantity of potassium persulphate was lower than 0.1%. The results show that at this low ACN concentration the level of α-methylstyrene removal was considerably lower than in Examples 11 and 12, in spite of the extra addition of initiator. The level of α-methylstyrene removal is about the same as that reached without any extra addition of water-soluble initiator (also see Comparative Example 1a). The results of this Example 13 are reported on Table 4.

EXAMPLE 14

In this Example, a ternary mixture of acrylonitrile, α-methylstyrene and methacrylate allyl ester in weight proportions of 31.9:67.7:0.4 respectively, was polymerized in an aqueous emulsion as described in Example 1, with potassium persulphate as the initiator. One hour before termination of the polymerization, 0.8 g potassium persulphate dissolved in 10 g water was added. Upon termination of the polymerization, it appeared that the monomer concentration in the reaction medium was 0.22% for ACN and 0.13% for α-methylstyrene, which means that the level of α-methylstyrene removal was very high.

Table 4

| | | Examples Acc. Invention | | | | Com. Examples | |
|---|---|---|---|---|---|---|---|
| | | 11 | | 12 | | 13 | |
| Monomer mix % | ACN | 36 | | 33 | | 30 | |
| | α-m.s. | 74 | | 67 | | 70 | |
| Polymerization time (min.) | | w.-% free mon. | mon. conv. U %/hr | w.-% free mon. | mon. conv. U %/hr | W.-% free mon. | mon. conv. U %/hr |
| 120 | ACN | 0.71 | | 0.17 | | 0.07 | |
| | α-m.s. | 1.23 | | 1.20 | | 1.18 | |
| 180 | ACN | 0.37 | | 0.07 | | 0.03 | |
| | α-m.s. | 0.27 | 78 | 0.62 | | 0.82 | 30 |

EXAMPLE 15

Example 14 was repeated with a ternary mixture containing 20.4 parts by weight of acrylonitrile, 67.9 parts by weight of α-methylstyrene and 11.7 parts by weight of methyl methacrylate (MMA). The MMA was not initially present, but was gradually supplied to the reactor over a period of about 40 minutes subsequent to addition of the initiator, and 30% of the required quantity of ACN was supplied to the reactor only after 190 minutes.

Next, after 240 minutes, 0.8 g potassium persulphate dissolved in 10 g water was added. After 300 minutes, it appeared that the monomer concentration in the reaction medium was D.13% of ACN plus MMA and 0.63% of α-methylstyrene.

What is claimed is:

1. In a process for the preparation of a copolymer by the polymerization of about 25 to 85 parts by weight of a monomer selected from group A consisting of styrene, α-methylstyrene and a combination thereof, and about 15 to 75 parts by weight of a monomer selected from group B consisting of acrylonitrile, methacrylonitrile and a combination thereof, in an aqueous dispersion of said monomers in the presence of a first at least one compound yielding free radicals, thereby forming an aqueous reaction medium containing said copolymer as well as remaining non-converted monomer, the improvement comprising carrying out said polymerization in said dispersion in the additional presence of a synthetic rubber-like polymer and adding to said reaction medium while at a temperature of between 30° and 120° C., a second at least one compound yielding water-soluble free radicals, having a half-life of less than five hours and in a quantity of between about 0.05 to 2.5 parts per 100 parts by weight of monomer and copolymer in said reaction medium, said addition taking place at a point of time at which (a) the rate of conversion of monomer to said copolymer is less than 15% per hour, (b) the degree of conversion of monomer to said copolymer is greater than 75%, and (c) the amount of non-converted monomer from said group B remaining in said reaction medium is at least 0.1% by weight relative to the total weight of said reaction medium, and whereafter no additional monomer is added to said reaction medium.

2. The process of claim 1 wherein said copolymer is prepared by the polymerization of up to a maximum of 15 total parts by weight of one or more other monomers in addition to said monomers of group A and group B.

3. The process of claim 1 wherein the quantity of said second at least one compound, yielding water-soluble free radicals, added to said reaction medium is between about 25% and 500% by weight of the quantity of said first at least one compound previously added to said dispersion.

4. The process of claim 3 wherein the quantity of said second at least one compound, yielding water-soluble free radicals, is between about 50% and 300% by weight of the quantity of said first at least one compound previously added to said dispersion.

5. The process of claim 1 wherein said second at least one compound, yielding water-soluble free radicals, is added to said reaction medium when the degree of conversion of monomer to said copolymer is greater than 80%.

6. The process of claim 5 wherein said second at least one compound, yielding water-soluble free radicals, is added to said reaction medium when the degree of conversion of monomer to said copolymer is greater than 90%.

7. The process of claim 1 wherein said second at least one compound, yielding water-soluble free radicals, is added to said reaction medium when the rate of conversion of monomer to said copolymer is less than 8% per hour.

8. The process of claim 7 wherein said second at least one compound, yielding water-soluble free radicals, is added to said reaction medium when the rate of conversion of monomer to said copolymer is less than 4% per hour.

9. The process of claim 1 wherein said second at least one compound, yielding water-soluble free radicals, is added to said reaction medium when the amount of non-converted monomer from said group B remaining in said reaction medium is at least 0.2% by weight relative to the total weight of said reaction medium.

10. The process of claim 9 wherein said second at least one compound, yielding water-soluble free radicals, is added to said reaction medium when the amount of non-converted monomer from said group B remaining in said reaction medium is at least 0.5% by weight relative to the total weight of said reaction medium.

11. The process of claim 1 wherein said copolymer is prepared by the polymerization of more than 50 parts by weight of $\alpha$-methylstyrene.

12. The process of claim 1 wherein said dispersion is an emulsion.

13. The process of claim 1 wherein the temperature of said reaction medium is at least 45° C. subsequent to the addition of said second at least one compound, yielding water-soluble free radicals.

14. The process of claim 1 wherein the half-life period of said second at least one compound, yielding water-soluble free radicals, is less than one hour at the temperature of said reaction medium subsequent to the addition of said second at least one compound.

15. The process of claim 1 wherein said second at least one compound, yielding water-soluble free radicals, is selected from the group consisting of tertiary-butyl-peroxy compounds, hydroperoxides and persulphates.

* * * * *